US010182110B2

(12) United States Patent
Okada et al.

(10) Patent No.: US 10,182,110 B2
(45) Date of Patent: Jan. 15, 2019

(54) TRANSFER FORMAT FOR STORAGE SYSTEM, AND TRANSFER METHOD

(71) Applicant: Hitachi, Ltd., Tokyo (JP)

(72) Inventors: Wataru Okada, Tokyo (JP); Norio Shimozono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 14/767,137

(22) PCT Filed: Dec. 13, 2013

(86) PCT No.: PCT/JP2013/083471
§ 371 (c)(1),
(2) Date: Aug. 11, 2015

(87) PCT Pub. No.: WO2015/087442
PCT Pub. Date: Jun. 18, 2015

(65) Prior Publication Data
US 2015/0373105 A1 Dec. 24, 2015

(51) Int. Cl.
*G06F 1/00* (2006.01)
*H04L 29/08* (2006.01)
*G06F 3/06* (2006.01)

(52) U.S. Cl.
CPC .......... *H04L 67/1095* (2013.01); *G06F 3/061* (2013.01); *G06F 3/0605* (2013.01); *G06F 3/0607* (2013.01); *G06F 3/067* (2013.01); *G06F 3/0613* (2013.01); *G06F 3/0647* (2013.01);
(Continued)

(58) Field of Classification Search
CPC ........ G06F 3/0647; G06F 3/067; G06F 3/061; G06F 3/607; G06F 11/1076; G06F 9/5077; H04L 67/1097
See application file for complete search history.

(56) References Cited

U.S. PATENT DOCUMENTS

2005/0154852 A1* 7/2005 Nakagawa ............ G06F 3/0605
711/170
2008/0034005 A1 2/2008 Satoyama et al.
(Continued)

OTHER PUBLICATIONS

International Search Report of PCT/JP2013/083471.

*Primary Examiner* — Barbara B Anyan
(74) *Attorney, Agent, or Firm* — Mattingly & Malur, PC

(57) ABSTRACT

If resources allocated to a host computer exist in different physical storage nodes within a virtual storage system after performing migration to a storage system, mapping of resources among the physical storage nodes becomes necessary, and if the amount of communication between physical storage nodes that occurs during access to resources exceeds a bandwidth of the connection path, the host I/O performance may be deteriorated compared to the performance before migration. Therefore, when migration is performed from a first physical storage node to a virtual storage system composed of a plurality of second physical storage nodes, a management computer allocates resources of the second physical storage nodes within a range of bandwidth of the transfer path between the second physical storage nodes based on configuration information of the plurality of second physical storage nodes, performance information, and load information of the volume provided by the first physical storage node.

13 Claims, 13 Drawing Sheets

(52) U.S. Cl.
CPC .......... *G06F 3/0659* (2013.01); *G06F 3/0689* (2013.01); *H04L 67/1097* (2013.01)

(56) References Cited

U.S. PATENT DOCUMENTS

| | | | | |
|---|---|---|---|---|
| 2008/0104349 | A1* | 5/2008 | Maruyama | G06F 3/0613 711/165 |
| 2008/0201542 | A1* | 8/2008 | Maruyama | G06F 3/0607 711/165 |
| 2011/0047190 | A1* | 2/2011 | Lee | H04L 67/1095 707/803 |
| 2011/0082988 | A1* | 4/2011 | Kono | G06F 3/0605 711/161 |
| 2011/0191537 | A1* | 8/2011 | Kawaguchi | G06F 3/0605 711/114 |
| 2013/0067187 | A1* | 3/2013 | Moss | G06F 3/0689 711/170 |
| 2015/0178115 | A1* | 6/2015 | Shiva | H04L 12/4641 718/1 |
| 2015/0319245 | A1* | 11/2015 | Nishihara | G06F 3/0604 709/213 |
| 2015/0363422 | A1* | 12/2015 | Shibayama | G06F 3/0605 707/827 |

\* cited by examiner

FIG. 2

STORAGE NODE INFORMATION TABLE 1051

| STORAGE NODE ID | PORT PERFORMANCE (MBPS) | CPU PERFORMANCE (MIPS) | CACHE CAPACITY (GB) | STORAGE CAPACITY (GB) |
|---|---|---|---|---|
| 1000 | 2000 | 5220 | 4 | 10000 |
| 1001 | 2000 | 5220 | 8 | 20000 |

Columns: 2001, 2002, 2003, 2004, 2005

FIG. 3

TRANSFER BANDWIDTH BETWEEN STORAGE NODES INFORMATION TABLE 1052

| STORAGE NODE ID1 | STORAGE NODE ID2 | TRANSFER BANDWIDTH (MBPS) |
|---|---|---|
| 1000 | 1001 | 500 |
| 1001 | 1000 | 300 |
| 1001 | 1002 | 500 |

Columns: 3001, 3002, 3003

FIG. 4

VOLUME INFORMATION TABLE 1053

| STORAGE NODE ID | VOL ID | PORT USE QUANTITY (MBPS) | CPU USE RATE (%) | CACHE USE QUANTITY (MB) | STORAGE CAPACITY (GB) | ALLOCATION DESTINATION HOST (WWN) |
|---|---|---|---|---|---|---|
| 2000 | 100 | 100 | 1 | 100 | 100 | ff:ff:ff:ff... |
| 2000 | 101 | 200 | 2 | 150 | 200 | ff:ff:ff:fe... |

Columns: 4001, 4002, 4003, 4004, 4005, 4006, 4007

FIG. 5

THRESHOLD VALUE INFORMATION TABLE 1054

| PORT USE RATE THRESHOLD (%) | CPU USE RATE THRESHOLD (%) | CACHE USE RATE THRESHOLD (%) | STORAGE CAPACITY USE RATE THRESHOLD (%) | TRANSFER BANDWIDTH BETWEEN STORAGE NODES USE RATE THRESHOLD (%) |
|---|---|---|---|---|
| 70 | 75 | 75 | 80 | 60 |

Columns: 5001, 5002, 5003, 5004, 5005

FIG. 8
LOCAL COPY INFORMATION TABLE

| STORAGE NODE ID (8001) | COPY GROUP ID (8002) | PRIMARY VOLUME (8003) | SECONDARY VOLUME (8004) | CPU USE RATE (%) (8005) | CACHE CAPACITY (MB) (8006) |
|---|---|---|---|---|---|
| 1000 | 1 | 100 | 200 | 1 | 30 |
| 1000 | 1 | 101 | 201 | 2 | 30 |
| 1000 | 2 | 102 | 202 | 1 | 20 |

FIG. 9
SNAPSHOT INFORMATION TABLE

| STORAGE NODE ID (9001) | SS GROUP ID (9002) | VOLUME ID (9003) | SS VOLUME ID (9004) | CPU USE RATE (%) (9005) | CACHE CAPACITY (MB) (9006) | POOL ID (9007) |
|---|---|---|---|---|---|---|
| 1000 | 3000 | 100 | 300 | 1 | 30 | 1 |
| 1000 | 2000 | 100 | 301 | 2 | 30 | 1 |
| 1000 | 2000 | 102 | 302 | 1 | 20 | 1 |

FIG. 10
POOL INFORMATION TABLE

| STORAGE NODE ID (10001) | POOL ID (10002) | POOL VOL ID (10003) |
|---|---|---|
| 1000 | 1 | 400 |
| 1000 | 1 | 401 |
| 1000 | 2 | 402 |

FIG. 11
RELATED VOLUME GROUP INFORMATION TABLE

| STORAGE NODE ID (11001) | GROUP ID (11002) | ASSOCIATED VOLUME ID (11003) | TOTAL PORT USE QUANTITY (MBPS) (11004) | TOTAL CPU USE RATE (%) (11005) | TOTAL CACHE CAPACITY (MB) (11006) | TOTAL STORAGE CAPACITY (GB) (11007) |
|---|---|---|---|---|---|---|
| 1000 | 2000 | 100, 101, 200, 201, 300, 301, 400, 401 | 300 | 8% | 400 | 500 |
| 1000 | 2001 | 102, 202, 302, 402 | 250 | 5% | 300 | 400 |

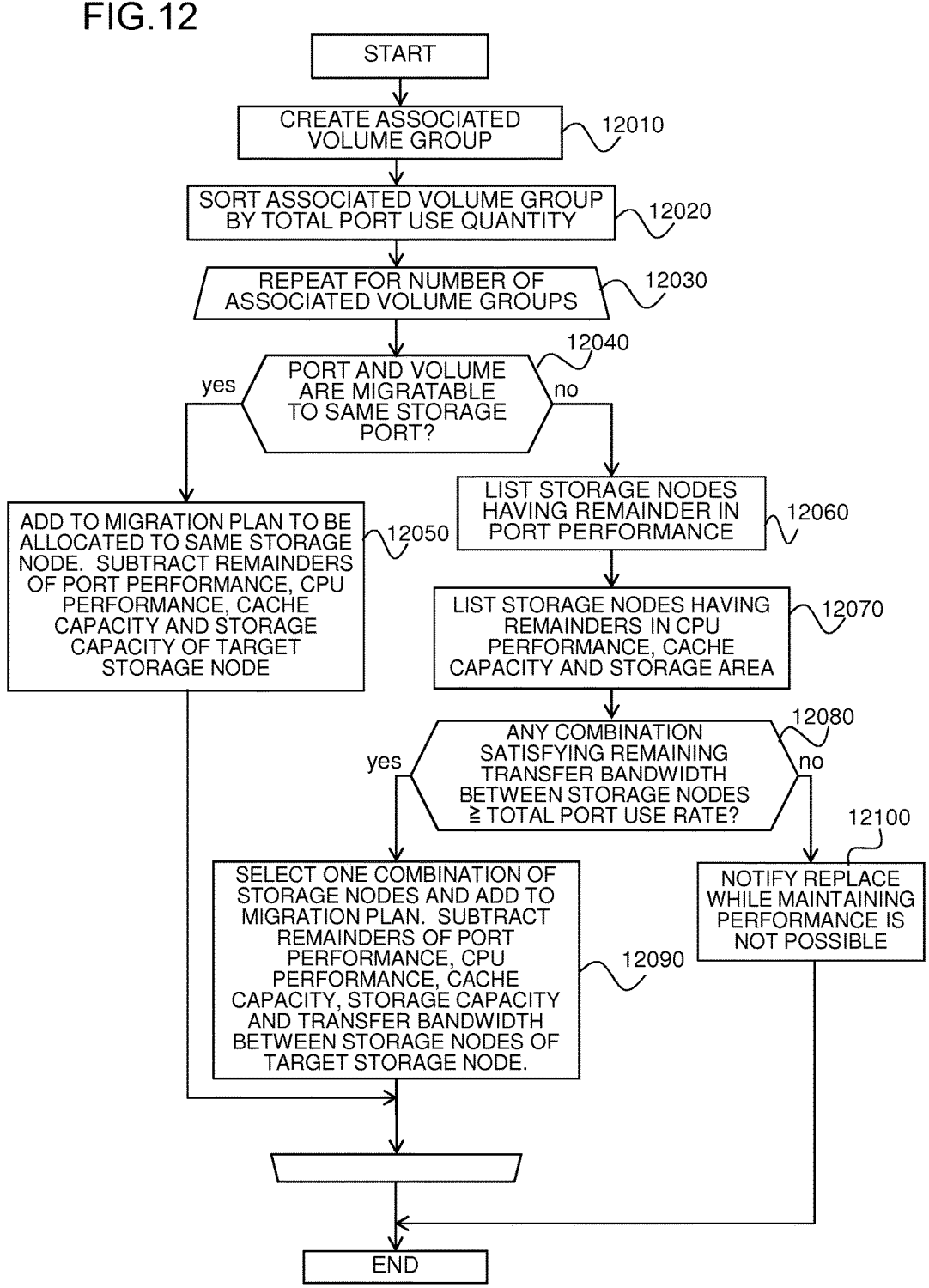

FIG.15
STORAGE NODE INFORMATION TABLE

| STORAGE NODE ID | PORT PERFORMANCE (Mbps) | BE PORT PERFORMANCE (Mbps) | CPU PERFORMANCE (MIPS) | CACHE CAPACITY (GB) | STORAGE CAPACITY (GB) |
|---|---|---|---|---|---|
| 1000 | 2000 | 2000 | 5220 | 4 | 10000 |
| 1001 | 2000 | 2000 | 5220 | 8 | 20000 |

(column IDs: 2001, 2002, 15001, 2003, 2004, 2005)

FIG.16
VOLUME INFORMATION TABLE

| STORAGE NODE ID | VOL ID | PORT USE QUANTITY (Mbps) | BE PORT USE QUANTITY (Mbps) | CPU USE RATE (%) | CACHE USE QUANTITY (MB) | STORAGE CAPACITY (GB) | ALLOCATION DESTINATION HOST (WWN) |
|---|---|---|---|---|---|---|---|
| 2000 | 100 | 100 | 10 | 1% | 100 | 100 | ff:ff:ff:ff... |
| 2000 | 101 | 200 | 20 | 2% | 150 | 200 | ff:ff:ff:fe... |

(column IDs: 4001, 4002, 4003, 16001, 4004, 4005, 4006, 4007)

FIG.17
MIGRATION PLAN TABLE

| STORAGE NODE ID | VOL ID | PORT USE STORAGE NODE ID | CACHE USE STORAGE NODE ID | STORAGE AREA USE STORAGE NODE ID |
|---|---|---|---|---|
| 2000 | 100 | 1000 | 1000 | 1000 |
| 2000 | 101 | 1001 | 1001 | 1001 |

(column IDs: 17001, 17002, 17003, 17004, 17005)

TRANSFER FORMAT FOR STORAGE SYSTEM, AND TRANSFER METHOD

TECHNICAL FIELD

The present invention relates to a system and method for migrating a storage system in a computer system composed of a storage system for storing data accessed from a host computer and a management computer for managing the storage system.

BACKGROUND ART

The storage system connected to the host computer via a network has multiple magnetic disks, for example, as storage devices for storing data. In the storage system, RAID (Redundant Array of Independent Disks) groups (also referred to as parity groups) are constituted by forming redundant storage areas composed of multiple storage devices via RAID technique. Then, the storage system provides a portion of the RAID groups as a storage area having a capacity required by the host computer in the form of a logical volume to the host computer.

Further, a technique is disclosed that gathers multiple physical storage systems and provides the same as a single virtual storage system to the host computer (refer for example to Patent Literature 1). This technique enables to manage multiple physical storage systems as a single storage system.

CITATION LIST

Patent Literature

[PTL 1] U.S. Patent Application Publication No. 2008/0034005

SUMMARY OF INVENTION

Technical Problem

When migrating a system from a single physical storage system (migration source storage system) to a virtual storage system (migration destination storage system) composed of multiple physical storage systems, the location of resources used after migration changes according to the status of vacancy of the respective physical storage system resources (such as ports, caches and volumes) constituting the migration destination storage system. There are cases where only the resources of a single physical storage system are used, or where resources distributed in different physical storage systems are used.

After such migration of the storage system, if resources (such as ports and volumes) allocated to a single host computer exist in different physical storage systems in the virtual storage system, mapping of the resources (such as volumes) among physical storage systems becomes necessary to enable the host computer to access the resources (such as volumes). At that time, communication occurs among physical storage systems when the host computer accesses the volumes. If the amount of communication exceeds the bandwidth of the path connecting the physical storage systems, a drawback occurs in which the host I/O performance in the virtual storage system is deteriorated compared to the performance prior to migration of the storage system.

Hereafter, in the description of the present invention, the physical storage system is uniformly referred to as a "storage node" and the virtual storage system is uniformly referred to as a "virtual storage system".

Solution to Problem

A computer system according to the present invention includes a host computer, a first physical storage node, a plurality of second physical storage nodes which are mutually connected, and a management computer for managing the first and the plurality of second physical storage nodes, wherein the plurality of second physical storage nodes provide a virtual storage system in response to the host computer using a same identifier, and when a single second physical storage node receives an I/O command from the host computer, it transfers the I/O command to other second physical storage nodes, and the management computer collects the configuration information and the performance information of the storage from the first physical storage node and the plurality of second physical storage nodes, and also collects the volumes and related load information provided from the first physical storage node.

Then, when migrating the system from the first physical storage node to the virtual storage system, the management computer allocates resources of the second physical storage nodes within a range of bandwidth of the transfer path mutually connecting the second physical storage nodes, based on the configuration information and performance information of the plurality of second physical storage nodes and a load information of the volumes provided by the first physical storage node.

Advantageous Effects of Invention

The present invention can exert an effect of migrating a system from one or more physical storage nodes to a virtual storage system without deteriorating the I/O performance.

BRIEF DESCRIPTION OF DRAWINGS

FIG. 2 is a view illustrating an example of a storage node information table according to Embodiment 1.

FIG. 3 is a view illustrating an example of a transfer bandwidth between nodes information table according to Embodiment 1.

FIG. 4 is a view illustrating an example of a volume information table according to Embodiment 1.

FIG. 5 is a view illustrating an example of a threshold value information table according to Embodiment 1.

FIG. 8 is a view illustrating an example of a local copy information table according to Embodiment 2.

FIG. 9 is a view illustrating an example of a snapshot information table according to Embodiment 2.

FIG. 10 is a view illustrating an example of a pool information table according to Embodiment 2.

FIG. 11 is a view illustrating an example of an associated volume group information table according to Embodiment 2.

FIG. 12 is a view illustrating an example of the details of processing of the migration plan creation program according to Embodiment 2.

FIG. 15 is a view illustrating an example of a storage node information table according to Embodiment 4.

FIG. 16 is a view illustrating an example of a volume information table according to Embodiment 4.

FIG. 17 is a view illustrating a migration plan table according to Embodiment 4.

DESCRIPTION OF EMBODIMENTS

The outline of the present invention will be described with reference to FIG. 21, prior to describing the preferred embodiments of the present invention.

Figure 21:
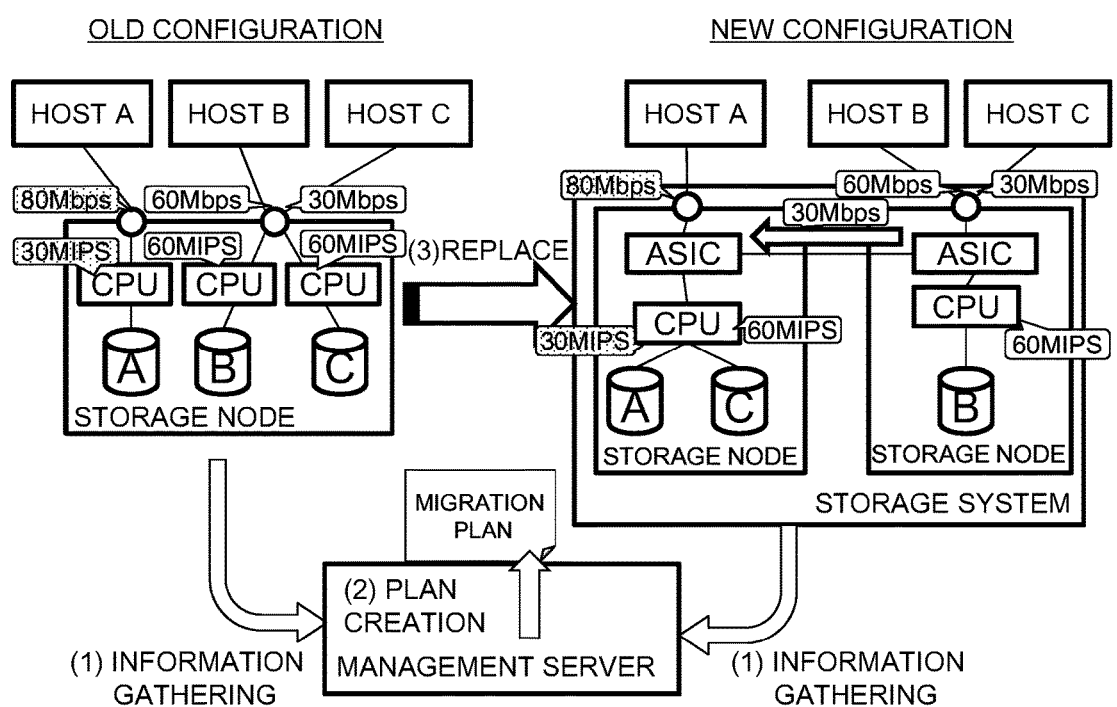
FIG. 21 is a view illustrating an outline of the flow of migration from a single physical storage node (old configuration) to a virtual storage system (new configuration) composed of multiple physical storage nodes.

FIG. 21 is a view showing an outline of the flow of migrating from an old configuration having a single physical storage node to a new configuration having a virtual storage system formed of multiple physical storage nodes.

The physical storage node having the old configuration provides three volumes. The CPU performance (MIPS) and the port performance (Mbps) that each volume requires are, 30 MIPS and 80 Mbps in volume A, 60 MIPS and 60 Mbps in host B, and 60 MIPS and 30 Mbps in host C, respectively.

In the new configuration, the multiple physical storage nodes constituting the virtual storage system have the same specs, wherein the CPU performance is 100 MIPS and the port performance is 100 Mbps. The physical storage nodes are connected internally via ASIC, which enables to transfer I/O commands and relay transmission and reception of data with only a slight deterioration of response performance. The transfer performance is 50 Mbps.

At this time, the management server gathers configuration information and performance information from the physical storage nodes of the old configuration and the physical storage nodes of the new configuration ((1) information gathering of FIG. 21). Then, a migration plan is created so that there is as little data transfer as possible between physical storage nodes in the new configuration, and so that the volumes and ports are allocated as resources from the same physical storage node in the order from those requiring higher port performances ((2) plan creation of FIG. 21).

Actually, whether resources can be allocated from a single physical storage node is determined for volume A, volume B and volume C in the named order. As a result, volume A can have a CPU and a port allocated from a single storage node. Volume B can also be allocated in a similar manner. However, as for the last volume C, there is no single physical storage node capable of allocating a storage area and a CPU, so that there is a need to allocate them from different physical storage nodes. However, the port performance required by volume C is smaller than the transfer bandwidth between physical storage nodes, so that migration can be performed without much performance deterioration ((3) replacement of FIG. 21).

The present invention enables to reduce deterioration of I/O performance by migrating to the virtual storage system environment. Especially in a case where the storage is provided to an application using and consuming a large amount of storage resources, such as the analysis of big data, there may not be enough storage resources by using only one storage node. In such case, it is possible to perform migration to a virtual storage system composed of multiple storage nodes. In such case, performance is expected to be improved by the migration, so that the present invention is especially useful in that deterioration of I/O performance is reduced and the improvement of I/O performance by enabling resources of the virtual storage to be used is realized.

<Embodiment 1>

Figure 1:
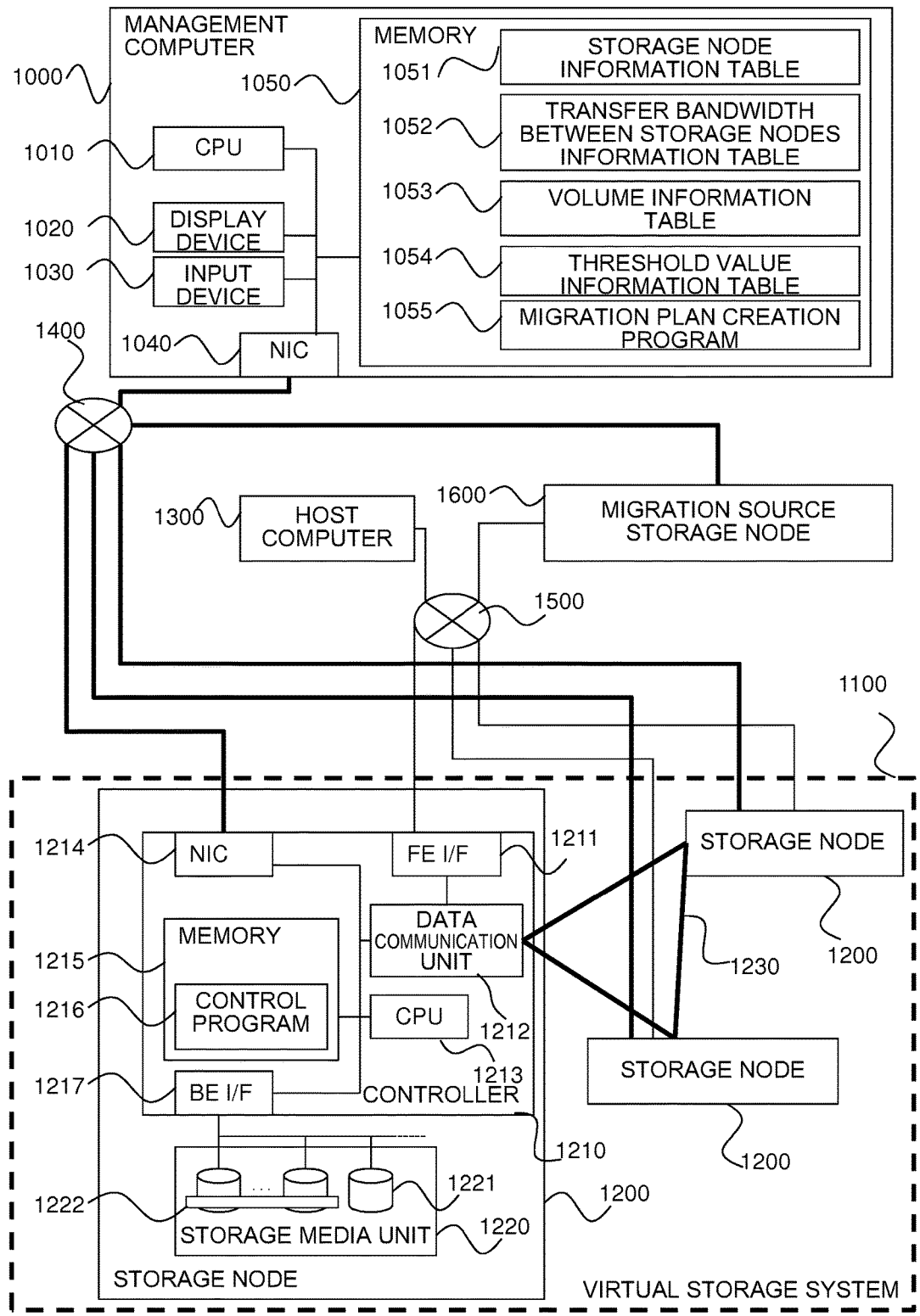
FIG. 1 is a view illustrating a configuration example of a computer system according to Embodiment 1.

FIG. 1 is a view illustrating a configuration example according to a first embodiment of a computer system to which the present invention is applied. The present computer system is composed of a management computer 1000, a virtual storage system 1100, a host computer 1300, and a migration source storage node 1600. The virtual storage system 1100 is composed of multiple storage nodes 1200.

The management computer 1000, the storage node 1200 and the migration source storage node 1600 are mutually connected via the management network 1400 (such as a LAN: Local Area Network). The management network 1400 is a network for mainly communicating management data. The management network 1400 can be any type of network other than the IP network, such as the one using a SAN, as long as it is a network for communicating management data.

The storage node 1200, the host computer 1300 and the migration source storage node 1600 are mutually connected via a data network 1500 (such as a SAN: Storage Area Network). The data network 1500 is a network used by the host computer 1300 when communicating data stored in the virtual storage system 1100. The data network 1500 can be any type of network such as the IP network, as long as it is a network for communicating data.

In FIG. 1, only one host computer 1300 is illustrated, but two or more host computers can be provided. Similarly, two or more migration source storage nodes 1600 can be provided. It is possible to compose a virtual storage system having multiple migration source storage nodes 1600 gathered, and in that case, the term "migration source storage node 1600" should be replaced by the term "virtual storage system". The migration destination virtual storage system 1100 is composed of three storage nodes 1200, but the number can be two, or more than three. The data network 1500 and the management network 1400 can be the same network.

The management computer 1000 is composed of a CPU 1010, a display device 1020, an input device 1030, an NIC 1040 and a memory 1050.

The input device 1030 is a device for receiving instructions from an administrator. The display device 1020 is a device for displaying the result of processing in response to an instruction from the administrator or the system conditions. The NIC 1040 is an I/F for connecting to the management network 1400.

The CPU 1010 operates according to programs stored in the memory 1050.

The memory 1050 stores a storage node information table 1051, a transfer bandwidth between storage nodes information table 1052, a volume information table 1053, a threshold information table 1054 and a migration plan creation program 1055. These tables will be described in detail later.

The migration plan creation program is a program for creating a plan to migrate from the migration source storage node 1600 to the virtual storage system 1100, and for executing the migration. The operation of this program will also be described in detail later.

A storage node 1200 is composed of a controller 1210 and a storage media unit 1220, which are connected via a high-speed internal network.

The storage media unit 1220 loads multiple storage media 1221 including hard disks and SSDs (Solid State Drives).

The controller 1210 is composed of an FE I/F 1211, a data communication unit 1212, a CPU 1213, an NIC 1214, a memory 1215 and a BE I/F 1217.

The NIC 1214 is an I/F for connecting to the management network 1400. The FE I/F 1211 is an I/F for connecting to the data network 1500. The BE I/F 1217 is an I/F for connecting to the storage media unit 1220. The CPU 1213 operates according to a program stored in the memory 1215.

The memory 1215 stores a control program 1216.

The control program 1216 is a program for controlling the storage node, wherein the storage media 1221 mounted to the storage media unit 1220 constitutes a RAID group, and creates a logical volume 1222 provided to the host computer 1300. Further, the control program 1216 reads/writes data to/from an appropriate storage media 1221 according to an I/O command from the host computer 1300 to the logical volume 1222 based on the information of the composed RAID group.

The control program 1216 provides a control information for determining the operation of the storage node 1200, and an API (Application Programming Interface) for referring to and updating an operation status. A management program (not illustrated) and the migration plan creating program 1055 operating in the management computer 1000 performs control and monitoring of the storage node using this API.

If the I/O command from the host computer 1300 to the logical volume 1222 is not an I/O command to a logical volume provided by the storage node 1200 in which the data communication unit 1212 is mounted, the data communication unit 1212 transfers an I/O command to an appropriate storage node 1200, and relays the transmission and reception of data. If the I/O command is to a logical volume provided by the storage node 1200 in which the unit 1212 is mounted, the unit 1212 transfers the I/O command to the CPU 1213 executing its own control program 1216.

For transferring the I/O command among storage nodes and relaying the transmission and reception of data, an internal connection 1230 is formed between the data communication units 1212 of the respective storage nodes 1200 constituting the virtual storage system 1100. This connection is a connection for data communication, such as a fiber channel, an SCSI (Small Computer System Interface) and a SAS (Serial Attached SCSI).

Further, an information (not shown) of the storage node 1200 storing the respective logical volumes required for transferring I/O commands and communicating data is stored in the data communication unit 1212. It is also possible to have the information managed by the control program 1216, and when an inquiry from the data communication unit 1212 is received, the storage destination storage node 1200 can respond thereto. Further, this information can be referred to or changed from the management computer 1000 or the like by sending an instruction to the control program 1216.

The migration source storage node 1600 basically has a similar configuration as the storage node 1200. However, the loading of the data communication unit 1212 is optional.

FIG. 2 illustrates one example of a storage node information table 1051 stored in the memory 1050.

The present table 1051 stores the performance information of the respective storage nodes 1200 and the migration source storage node 1600.

A storage node ID 2001 is an ID for uniquely identifying the storage nodes within the computer system. A port performance 2002 shows a maximum data transfer performance (throughput) of the FE I/F of the storage node. A CPU performance 2003 illustrates a CPU performance of the storage node. A cache capacity 2004 illustrates a cache capacity (GB) of the storage node. A storage capacity 2005 illustrates a storage capacity (GB) of the storage node. This storage capacity is the capacity of the RAID group.

These values are gathered in advance by the migration plan creation program 1055 from the respective storage nodes 1200 and 1600 via the management network 1400. It is also possible to have the values directly entered by the user via the input device 1030.

Embodiment 1 assumes that the storage nodes 1200 constituting the virtual storage system 1100 are unused, but according to another embodiment, if the storage node 1200 is already used for other purposes, the port performance 2002, the CPU performance 2003, the cache capacity 2004 and the storage capacity 2005 of the storage node 1200 are set as the remaining performance and capacity having subtracted the used portions.

FIG. 3 illustrates one example of a transfer bandwidth between storage nodes information table 1052 stored in the memory 1050.

The present table 1052 stores the information on the connection destination storage node name and the transfer bandwidth (Mbps) regarding a connection 1230 for communication between the storage nodes 1200 constituting the virtual storage system 1100.

A storage node ID 1 shown in column 3001 indicates a transfer source, and a storage node ID 2 shown in column 3002 indicates a transfer destination, which are IDs for uniquely identifying a storage node within the computer system. A transfer bandwidth 3003 indicates a transfer bandwidth of the connection between storage nodes shown by storage node ID 1 and storage node ID 2. The mutual communication between storage nodes is performed via full-duplex transmission, but the transfer bandwidths of the two directions may not be the same, and there may be differences in the transfer bandwidths according to direction, so that as shown in the first and second records of FIG. 3, the records may differ depending on whether the node is a transfer source or a transfer destination, even if the connection is formed between the same storage nodes.

These values are either gathered by the migration plan creation program 1055 in advance from the respective storage nodes 1200 via the management network 1400, or can be directly entered by the user using the input device 1030.

Embodiment 1 assumes that the storage nodes constituting the virtual storage system 1100 are not used, but according to another embodiment, if the storage nodes are already used for other purposes, the transfer bandwidth 3003 is set as the remaining transfer bandwidth having subtracted the used portion.

FIG. 4 illustrates one example of a volume information table 1053 stored in the memory 1050.

The present table 1053 stores information of the logical volumes 1222 provided to the host computer 1300 from the migration source storage node 1600.

A storage node ID 4001 is an ID for uniquely identifying the migration source storage node 1600. A VOL ID 4002 is an ID for uniquely identifying a logical volume in the migration source storage node 1600 shown by the storage node ID 4001. A port use rate 4003 shows a maximum value of a quantity of use (Mbps) of the port performance used by the logical volume specified by the storage node ID 4001 and the VOL ID 4002. A CPU use rate 4004 shows a maximum value of a CPU use rate (%) that the relevant logical volume uses in the migration source storage node 1600 shown by the storage node ID 4001. An amount of cache use 4005 illustrates a maximum value of cache capacity (MB) that the relevant logical volume uses in the migration source storage node 1600 shown by the storage node ID 4001. A storage capacity 4006 illustrates a maximum value of storage capacity (GB) that the logical volume uses in the migration source storage node 1600 shown by the storage node ID 4001. An allocation destination host 4007 shows which host computer 1300 the relevant logical volume is allocated to by WWN.

According to Embodiment 1, the values stored in the port use rate 4003, the CPU use rate 4004, the amount of cache use 4005 and the storage capacity 4006 are the respective maximum values, but according to another embodiment, the values can be statistically-processed values, such as time averaged values or maximum values having excluded the dispersed values.

These values are gathered in advance by the migration plan creation program 1055 from the migration source storage node 1600 via the management network 1400.

FIG. 5 illustrates one example of a threshold information table 1054 stored in the memory 1050.

The present table 1054 stores information used by the migration plan creation program 1055 when creating a migration plan.

A port use rate threshold value 5001 shows an upper limit of the port performance that the respective storage nodes 1200 will be using as a result of the migration by the percentage (%) of use rate. A CPU use rate threshold value 5002 shows an upper limit of the CPU performance that the respective storage nodes 1200 will be using as a result of the migration by the percentage (%) of use rate. A cache use rate threshold value 5003 shows an upper limit of the cache capacity that the respective storage nodes 1200 will be using as a result of the migration by the percentage (%) of use rate. A storage capacity use rate threshold value 5004 shows an upper limit of the storage capacity that the respective storage nodes 1200 will be using as a result of the migration by the percentage (%) of use rate. A transfer bandwidth between storage nodes use rate threshold value 5005 shows an upper limit of the transfer bandwidth between storage nodes that the respective storage nodes 1200 will be using as a result of the migration by the percentage (%) of use rate.

The respective threshold values are basically set by the user, but the set values are not always fixed, and can be changed.

Figure 6:
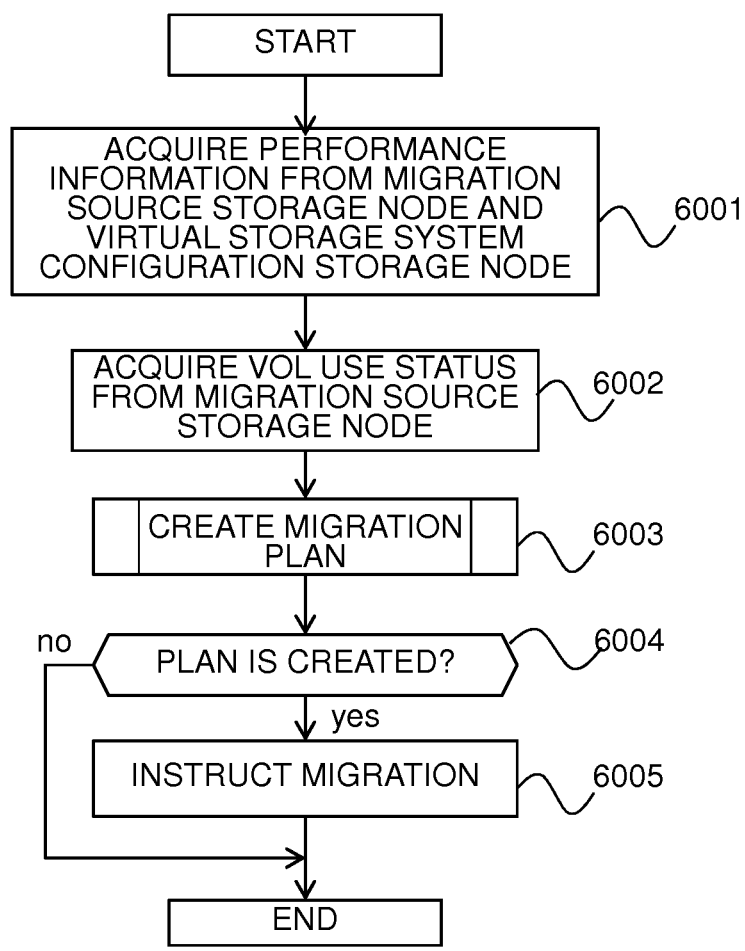
FIG. 6 is a flowchart illustrating an example of processing of a migration plan creation program according to Embodiment 1.

FIG. 6 is a flowchart illustrating an operation example of the migration plan creation program 1055.

The contents of the respective steps performed by the migration plan creation program 1055 after the migration plan creation program 1055 has been started will now be sequentially described.

In step 6001, the performance information of the respective storage nodes is gathered from the control program 1216 controlling the migration source storage node 1600 and the control program 1216 controlling the storage nodes 1200 constituting the virtual storage system 1100, and based thereon, the storage node information table 1051 (FIG. 2) and the transfer bandwidth between storage nodes information table 1052 (FIG. 3) are created. Further, as mentioned earlier, the table creation of present step 6001 can be performed through the input of the user.

In step 6002, the status of use of logical volumes is gathered from the control program 1216 controlling the migration source storage node 1600, and the volume information table 1053 (FIG. 4) is created.

In step 6003, a migration plan is created based on the gathered information. The migration plan illustrates which storage area of the storage node 1200 and which port of the storage node is used by the respective logical volumes 1222 of the migration source storage node 1600. The details of the migration plan created in step 6003 are described later with reference to FIG. 7.

In step 6004, the procedure advances to step 6005 if a migration plan could be created (yes) in the former step 6003, and the process is ended if the plan could not be created (no).

In step 6005, migration is executed using the created migration plan as the migration instruction.

In executing the above migration, the migration plan creation program 1055 creates a logical volume from the RAID group of the storage node 1200 using the storage area for each of the logical volumes 1222 of the migration source storage node 1600, and outputs an instruction to the control program 1216 to allocate the necessary cache capacity. Then, the migration plan creation program 1055 outputs an instruction to the control program 1216 to allocate the port of the storage node 1200 using the relevant port to the host computer 1300. The allocation destination host computer is determined by referring to the allocation destination host 4007 of the volume information table 1053. Finally, the migration plan creation program 1055 notifies a transfer control information for the data communication unit 1212 to transfer I/O commands and to relay data between storage nodes to the control programs 1216 of both the migration source and migration destination storage nodes.

According to Embodiment 1, the notification of transfer control information is performed even if the logical volume after migration uses the storage area and the port within the same storage node, but according to another embodiment, if the data communication unit 1212 is set to perform a process to skip the transfer of I/O commands and relay of data without notifying the transfer control information, the notification of control information will not be performed regarding the logical volume that uses the logical volume and port of the same storage node after migration.

Figure 7:
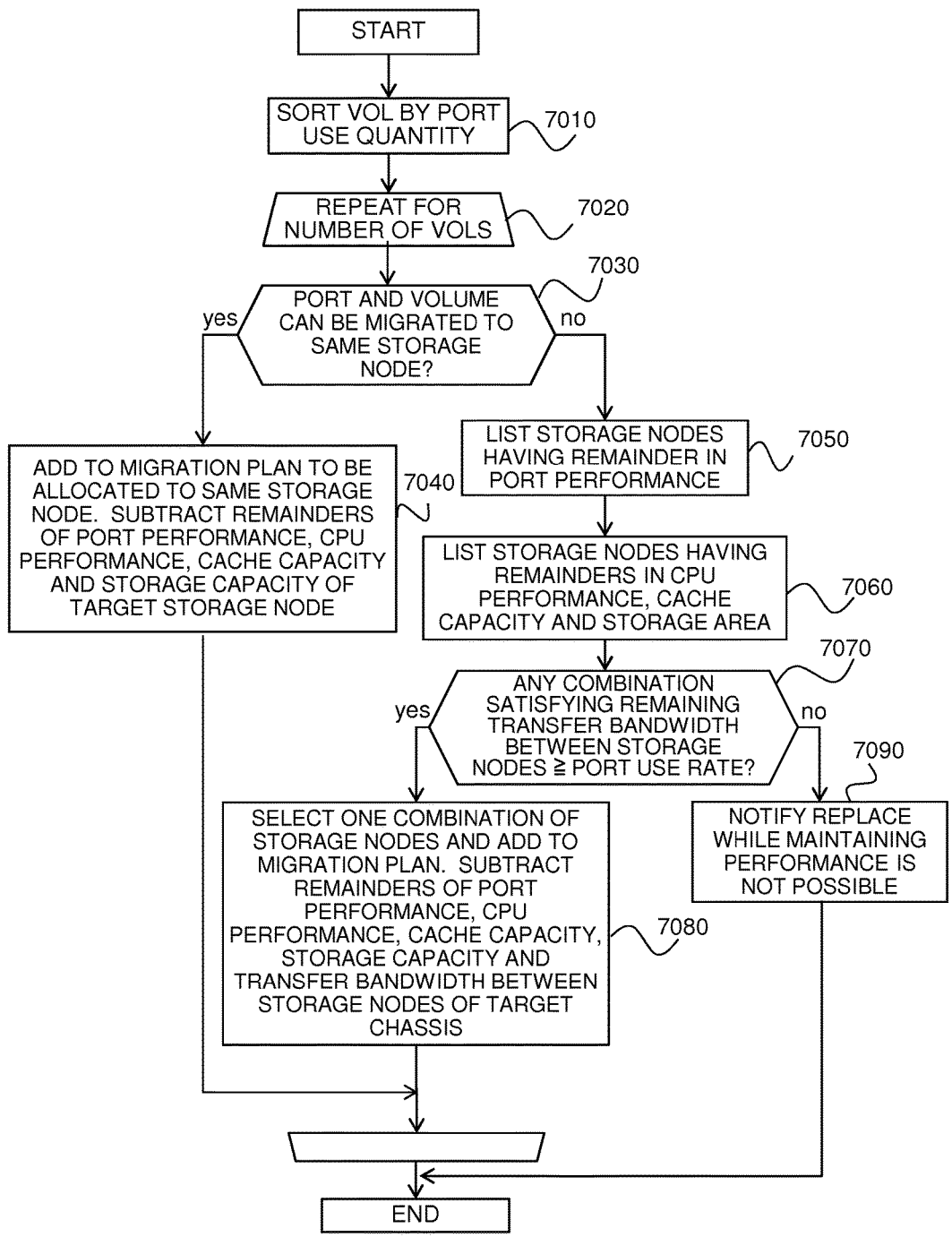
FIG. 7 is a view illustrating an example of the details of processing of the migration plan creation program according to Embodiment 1.

FIG. 7 is a flowchart illustrating an example of the detailed operation regarding the migration plan (step 6003) of FIG. 6 created by the migration plan creation program 1055. Now, the contents of the processing performed in the respective steps by the migration plan creation program 1055 will be described hereafter.

In step 7010, the logical volumes are sorted in order from those having greater values of port use rate 4003 in the volume information table 1053.

In step 7020, the subsequent processes are repeatedly performed corresponding to the number of sorted logical volumes.

In step 7030, it is determined whether the port performance and the storage capacity to be used by the relevant logical volume can be allocated as migration destination from the same storage node or not. In this step, determination is performed on whether there exists a storage node 1200, as the migration destination storage node, having sufficient remainders in the port use rate 4003 of the volume information table 1053, the CPU performance computed based on the CPU use rate 4004 of the volume information table 1053 and the CPU performance 2003 of the storage node information table 1051, and the cache capacity 4005 and the storage capacity 4006 in the volume information table 1053.

In the present determination process, the performance and capacity capable of being used (hereinafter respectively referred to as "remaining performance" and "remaining capacity") is computed by multiplying corresponding thresholds to respective values from the storage node information table 1051 and the threshold information table 1054. If the remaining performance and the remaining capacity are greater than the values thereof used by the relevant logical volume, it is determined that there is sufficient remainder and that allocation is possible, and if smaller, it is determined that there is no sufficient remainder and allocation is not possible.

In the present step 7030, if it is determined that allocation is possible from the same storage node 1200 (yes), in the subsequent step 7040, one of the allocatable storage nodes 1200 is selected and added to the migration plan so as to allocate the port and the storage capacity from that storage node 1200.

At that time, the quantities used by the relevant logical volume are subtracted from the remaining performance of the port, the remaining performance of the CPU, the remaining capacity of the cache and the remaining capacity of the storage capacity.

Thereafter, the procedure is advanced to step 7030 to perform the processing of the next logical volume.

On the other hand, if it is determined in step 7030 that allocation cannot be performed from the same storage node 1200 (no), in the subsequent step 7050, the storage nodes 1200 having sufficient remainder in the port performance are listed. Here, the listed nodes are the storage nodes 1200 having remaining performance of the port exceeding the performance of the port to be used by the relevant logical volume.

In step 7060, the storage nodes 1200 having sufficient remainders of CPU performance, cache capacity and storage capacity are listed. The storage nodes 1200 listed here have the remaining performance of the CPU, the remaining capacity of the cache and the remaining capacity of the storage capacity exceeding the CPU performance, the cache capacity and the storage capacity used by the relevant logical volume.

In step 7070, whether there is a combination of storage nodes 1200 having sufficient remainder in the data transfer bandwidth between the storage nodes 1200 is determined if the storage nodes 1200 listed in the former steps 7050 and 7060 are connected.

In this determination, the usable bandwidth (hereinafter referred to as "remaining bandwidth") is computed by multiplying the transfer bandwidth 3003 in the transfer bandwidth between storage nodes information table 1052 by the use rate threshold value 5005 of the transfer bandwidth between storage nodes in the threshold information table 1054. It is determined that sufficient remainder exists when the calculated remaining bandwidth is equal to or greater than the port performance used by the logical volume, and that there is no sufficient remainder when the value is smaller.

In step 7070, when it is determined that there is sufficient remaining bandwidth according to the combination of storage nodes (yes), in the subsequent step 7080, one of the combinations of storage nodes having sufficient remaining bandwidth is selected. Then, the combination is added to the migration plan so that a port is allocated from one of the combinations of storage nodes having remaining port performance and a storage capacity is allocated from the other storage node having remaining storage area.

At that time, the amount used by the relevant logical volume is subtracted from the remaining performance of the port of the storage node allocating the port and from the remaining performance of the CPU, the remaining capacity of the cache and the remaining capacity of the storage capacity of the storage node allocating the storage capacity. Further, the amount corresponding to the port performance used by the relevant logical volume is subtracted from the remaining bandwidth between the selected storage nodes.

Thereafter, the procedure advances to step 7030 to process the next logical volume.

On the other hand, if it is determined in step 7070 that there is no sufficient remaining bandwidth in the above-mentioned combination of storage nodes (no), then in step 7090, a notice is sent to the administrator notifying that replacement cannot be performed while maintaining performance, and the procedure is ended.

Embodiment 1 assumes that the data communication unit 1212 will not send an inquiry to the CPU 1213 operating the control program 1216 when transferring I/O commands and relaying data. According to another embodiment, if the unit sends an inquiry to the CPU 1213, the load applied on the CPU for responding thereto must be subtracted from the remaining performance of the CPU in step 7040 or step 7080.

As described, Embodiment 1 enables to perform migration so that the logical volume using much port performance can perform I/O processing without extending over multiple storage nodes. Therefore, migration from the migration source storage node 1600 to the virtual storage system 1100 can be performed without causing deterioration of I/O performance due to the limited transfer bandwidth of the connection between storage nodes.

<Embodiment 2>

Embodiment 2 illustrates an embodiment of a case where advanced processing such as replication (local copy) and snapshot of the logical volume 1222 can be performed in the migration source storage node 1600 and the migration destination storage node 1200. When such advanced processing is performed, it is necessary to allocate resources required for these processes in the same storage node as the storage node allocated to the storage area. Further, the forms and contents of Embodiment 2 are similar to Embodiment 1, so that only the differences with Embodiment 1 will be described below.

In Embodiment 2, the control program 1216 illustrated in FIG. 1 has a function to create a replication or a snapshot of the logical volumes. Further, the control program 1216 provides an API for reference or setting to the management computer 1000 to manage these functions. The replication (local copy) or snapshot function is taken as an example in the description of Embodiment 2, but it can be any other function of the storage node.

The memory 1050 of the management computer 1000 stores a local copy information table, a snapshot information table, a pool information table and an associated volume group information table (not shown). These tables will be described in detail later.

FIG. 8 is an example of the local copy information table stored in the memory 1050.

The present table stores information related to local copy.

A storage node ID 8001 is an ID for uniquely identifying a storage node within the computer system. A copy group ID 8002 is an ID of a copy group uniquely identified in the storage node 1600 shown by the storage node ID 8001. A primary volume 8003 is an ID of a logical volume uniquely identified in the storage node 1600 shown by the storage node ID 8001, and the logical volume shown by this ID is the replication source logical volume. A secondary volume 8004 is an ID of the logical volume uniquely identified in the storage node 1600 shown by the storage node ID 8001, and the logical volume shown by the ID is the replication destination logical volume. A CPU use rate 8005 is a maximum value of the CPU performance (%) required in the present copying process. A cache capacity 8006 is a maximum value of the cache capacity (MB) required for the present copying process.

In Embodiment 2, the values stored in the CPU use rate 8005 and the cache capacity 8006 are their respective maximum values, but according to another embodiment, the values can be statistically-processed values, such as the time averaged values or maximum values having excluded the dispersed values.

These values are gathered by the migration plan creation program 1055 in advance from the respective storage nodes 1200 via the management network 1400.

FIG. 9 illustrates an example of a snapshot information table stored in the memory 1050.

The present table stores information related to snapshots.

A storage node ID 9001 is an ID for uniquely identifying storage nodes within the computer system. An SS group ID 9002 is a snapshot group ID uniquely identified in the storage node 1600 shown by the storage node ID 9001. A volume ID 9003 is an ID of a logical volume uniquely identified in the storage node 1600 shown by the storage node ID 9001, wherein the logical volume shown by this ID is the snapshot source logical volume. An SS volume ID 9004 is an ID of a logical volume uniquely identified in the storage node 1600 shown by the storage node ID 9001, wherein the logical volume shown by this ID is the snapshot volume. A CPU use rate 9005 stores a maximum value of the CPU performance (%) required for the snapshot. A cache capacity 9006 is a maximum value of cache capacity (MB) required for the snapshot. A pool ID 9007 is a pool ID uniquely identified in the storage node 1600 shown by the storage node ID 9001, which is a pool used for the snapshot.

In Embodiment 2, the values stored in the CPU use rate 9005 and the cache capacity 9006 are their respective maximum values, but according to another embodiment, the values can be statistically-processed values, such as the time averaged values or maximum values having excluded the dispersed values.

These values are gathered by the migration plan creation program 1055 in advance from the respective storage nodes 1200 via the management network 1400.

FIG. 10 shows an example of a pool information table stored in the memory 1050.

The present tables stores information on the pools used for storing snapshots.

A storage node ID 10001 is an ID for uniquely identifying storage nodes within the computer system. A pool ID 10002 is a pool ID uniquely identified in the storage node 1600 shown by the storage node ID 10001. A pool VOL ID 10003 is a logical volume ID constituting the pool shown by the storage node ID 10001 and the pool ID 10002.

These values are gathered by the migration plan creation program 1055 in advance from the respective storage nodes 1200 via the management network 1400.

FIG. 11 shows an example of an associated volume group information table stored in the memory 1050.

The present table is a table having collected the logical volumes required to have storage areas allocated from the same storage node to enable the storage functions as mentioned above operate.

A storage node ID 11001 is an ID for uniquely identifying the storage nodes within the computer system. A group ID 11002 is an ID indicating the group of the logical volume. An associated volume ID 11003 is a list of logical volume IDs belonging to the group shown in the group ID 11002. A total port use rate 11004 shows a total port performance (Mbps) used by the volume group shown by the storage node ID 11001 and the associated volume ID 11003. A total CPU use rate 11005 shows a total CPU performance (%) used by the volume group shown by the storage node ID 11001 and the associated volume ID 11003. A total cache capacity 11006 shows a total cache capacity (MB) used by the volume group shown by the storage node ID 11001 and the associated volume ID 11003. A total storage capacity 11007 shows a total storage capacity (GB) used by the volume group shown by the storage node ID 11001 and the associated volume ID 11003.

FIG. 12 is a flowchart showing the detailed operation example of creation 6003 of the migration plan of FIG. 6 according to Embodiment 2. Now, the processing contents of the respective steps according to the migration plan creation program 1055 will be described sequentially.

In step 12010, the performance information is gathered from the control program 1216 of the migration source storage node 1600 to create an associated volume group information table of FIG. 11.

Actually, related information is gathered respectively from the local copy information table (FIG. 8), the snapshot information table (FIG. 9) and the pool information table (FIG. 10). Thereafter, associated information is registered to the associated volume group information table (FIG. 11) according to the functions planned to be executed.

For example, regarding a local copy function, the replication source and replication destination logical volumes are registered in the same associated volume group. Further, the replication source and replication destination logical volumes belonging to the same copy group ID are also registered in the same associated volume group. At that time, the CPU use rate 8005 and the cache capacity 8006 used for the local copy function are combined in addition to the port performance, the CPU performance, the cache capacity and the storage capacity used by the respective volumes, and the values are stored in the total port use rate 11004, the total CPU use rate 11005, the total cache capacity 11006 and the total storage capacity 11007.

Similarly, if the function is a snapshot function, the snapshot source and snapshot destination logical volumes are registered in the same associated volume group. Further, the replication source and replication destination logical volumes belonging to the same snapshot group are also registered in the same associated volume group. Further, the logical volumes constituting the pool used by the snapshot function are specified based on the pool information table (FIG. 10), and registered in the same associated volume group. At that time, the CPU use rate 9005 and the cache capacity 9006 used for the snapshot function are combined in addition to the port performance, the CPU performance, the cache capacity and the storage capacity used by the respective volumes, and the values are stored in the total port use rate 11004, the total CPU use rate 11005, the total cache capacity 11006 and the total storage capacity 11007.

The processes of the respective steps subsequent to step 12010 correspond to the processes performed in logical volume units in FIG. 7 of Embodiment 1, but are changed so that they are performed in associated volume group units.

In step 12020, the associated volume groups are sorted in order from those having greater values of the total port use rate 11004.

In step 12030, the subsequent processes are repeated corresponding to the number of groups for each sorted associated volume group.

In step 12040, it is determined whether the port performance and the storage capacity used in the relevant associated volume group can be allocated form the same storage node.

In this step 12040, if it is determined that allocation is possible from the same storage node (yes), one of the allocatable storage nodes 1200 is selected in step 12050, and the storage node 1200 is added to the migration plan to have the port and the storage capacity allocated therefrom. At that time, the total performance and capacity that the associated volume group uses are subtracted from the respective remaining performance and remaining capacity.

On the other hand, in step 12040, if it is determined that allocation is not possible from the same storage node 1200 (no), the nodes having sufficient remainder in the port performance are listed in step 12060. The nodes listed here are the storage nodes 1200 having a remaining port performance exceeding the total port performance used by the relevant associated volume group.

Next, in step 12070, the storage nodes 1200 having sufficient remainders in the CPU performance, the cache capacity and the storage capacity are listed. The storage nodes 1200 listed here are similarly determined using the total performance and total capacity of the associated volume group.

In step 12080, it is determined whether there is a combination of storage nodes 1200 having sufficient remainder in the data transfer bandwidth between storage nodes 1200 listed in the previous steps 12060 and 12070.

In the present step 12080, when it is determined that there is sufficient remaining bandwidth in the above combination of storage nodes (yes), one of the combinations of storage nodes having sufficient remaining bandwidth is selected in subsequent step 12090. Then, information is added to the migration plan so that one of the combinations of storage nodes having remainder in the port performance allocates a port and the other storage node having remainder in the storage area allocates a storage area.

In that case, the total performance and capacity used by the associated volume group are subtracted from the respective remaining performance and remaining capacity. Further, the port performance used by the relevant associated volume group is subtracted from the remaining bandwidth between the selected storage nodes.

Thereafter, the procedure advances to step 12040 to carry out the processes of the next associated volume group.

On the other hand, if it is determined in step 12080 that there is no sufficient remaining bandwidth in the above combination of storage nodes (no), a notice is sent to the administrator notifying that replacement cannot be performed while maintaining performance in step 12100, and the process is ended.

Further, after completing the above-described migration plan create processing, it is necessary to set up a function corresponding to the processes such as replication (local copy) and snapshot in the migration instruction of step 6005 of FIG. 6.

As described, Embodiment 2 enables to perform migration from the migration source storage node 1600 to the virtual storage system 1100 without causing deterioration of I/O performance caused by the limited transfer bandwidth of the connection between storage nodes performing advanced processing such as the replication (local copy) and snapshot functions.

<Embodiment 3>

Embodiment 1 described earlier adopts a configuration where all the storage nodes 1200 constituting the virtual storage system 1100 are directly connected in a mesh-like form via internal connection. On the other hand, there may be a case where the storage nodes connected to transfer data are not directly connected but connected via a third storage node 1200 in the form of a daisy chain. In that case, it may be possible for the transfer of I/O commands or relay of data via a data communication unit to extend over three or more storage nodes, depending on the adopted logical volume migration system. Then, the efficiency may be deteriorated by using the transfer bandwidths formed between multiple storage nodes. Embodiment 3 corresponds to such transfer form.

Embodiment 3 includes portions which are substantially the same as the contents of processing according to Embodiment 1, so that only the differences with Embodiment 1 are described below.

Figure 13:
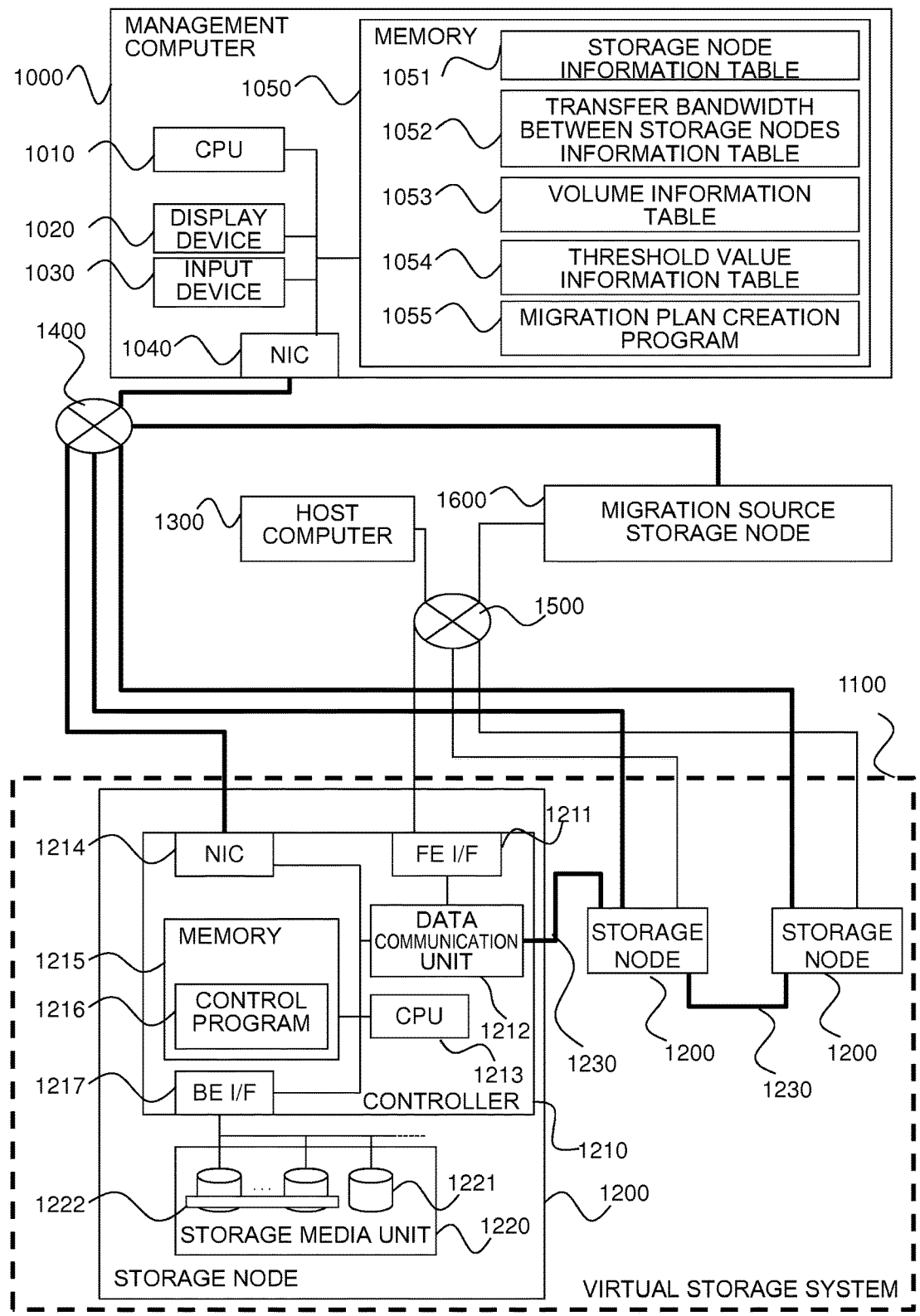
FIG. 13 is a view illustrating a configuration example of a computer system according to Embodiment 3.

FIG. 13 is a configuration example of a computer system according to Embodiment 3.

Embodiment 1 illustrates a configuration where the data communication units 1212 of the respective storage nodes 1200 constituting the virtual storage system 1100 are mutually directly connected via the internal connection 1230 (FIG. 1). However, Embodiment 3 adopts a configuration where the storage nodes 1200 are not directly mutually connected, but instead, connected via other storage nodes 1200, as in the internal connection 1230 illustrated in FIG. 13.

Figure 14:
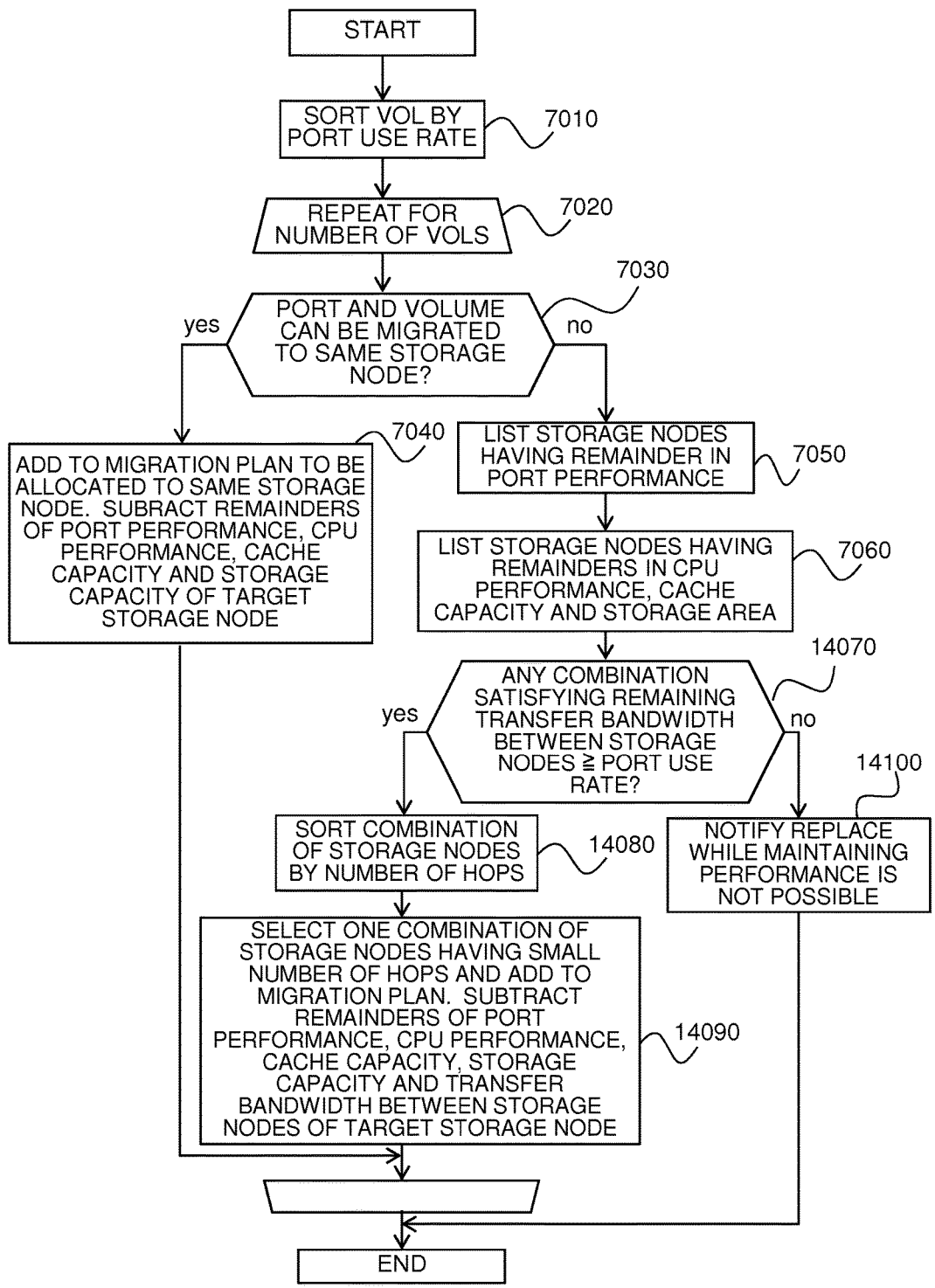
FIG. 14 is a view illustrating an example of the details of processing of the migration plan creation program according to Embodiment 3.

FIG. 14 is a flowchart illustrating a detailed operation example for creating a migration plan in step 6003 of FIG. 6 according to Embodiment 3. Since the contents of processing from step 7010 to step 7060 are equivalent to Embodiment 1, so that in the following description, the subsequent processes according to the migration plan creation program 1055 will be described.

In step 14070, it is determined whether there is a combination of storage nodes 1200 having sufficient remainders in the data transfer bandwidths between respective storage nodes 1200 listed in the previous steps 7050 and 7060. At this time, a transfer bandwidth between storage nodes information table 1052 (FIG. 3) is referred to at first, and the shortest path of internal connection between the storage nodes 1200 is computed. Then, if the remaining bandwidths of all internal connections along the path exceed the port performance used by the logical volumes, it is determined that there is sufficient remainder, and if not, it is determined that there is no sufficient remainder.

In step 14070, if it is determined that there is sufficient remaining bandwidth in the above combination of storage nodes 1200 (yes), in the subsequent step 14080, the combination of storage nodes having sufficient remaining bandwidths are sorted by the number of storage nodes in the path (number of hops).

Next, in step 14090, one of the combinations of storage nodes having the smallest number of storage nodes in the path (number of hops) is selected. Then, information is added to the migration plan to have a port allocated from one of the storage nodes in the combination having remaining port performance, and to have a storage capacity allocated from the other storage node having remaining storage area.

At that time, the amount used by the relevant logical volume is subtracted from the remaining performance of the port of the storage node allocating the port and from the remaining performance of the CPU, the remaining capacity of the cache and the remaining capacity of the storage capacity of the storage node allocating the storage capacity. Further, the amount corresponding to the port performance used by the relevant logical volume is subtracted from the remaining bandwidths of the internal connection between the storage nodes in the path.

Thereafter, the procedure is advanced to step 7030 to process the next logical volume.

On the other hand, if it is determined in step 14070 that there is no sufficient remaining bandwidth in the above-mentioned combination of storage nodes, then in step 14100, a notice is sent to the administrator notifying that replacement cannot be performed while maintaining performance, and the procedure is ended.

As described, Embodiment 3 enables to perform migration from the migration source storage node 1600 to the virtual storage system 1100 without causing deterioration of I/O performance due to the limited transfer bandwidth of the connection between storage nodes, even in a configuration where storage nodes 1200 are not mutually directly connected but are connected via a third storage node 1200, such as in a daisy chain connection.

<Embodiment 4>

Embodiment 1 described earlier adopts a configuration where the data communication unit 1212 executes transfer of I/O commands from the host computer 1300 and relays data. Embodiment 4 corresponds to a configuration where the data communication unit 1212 transfers I/O commands from the BE I/F to the storage media unit and relays data.

Embodiment 4 includes portions which are substantially the same as the processing contents according to Embodiment 1, so that only the differences with Embodiment 1 are described below.

FIG. 15 shows an example of a storage node information table used in Embodiment 4.

The table is basically the same as the storage node information table 1051 shown in FIG. 2, but with a BE port performance 15001 added thereto. This column shows the performance of the BE I/F.

FIG. 16 shows an example of a volume information table used in Embodiment 4.

The table is basically the same as the volume information table 1053 of FIG. 4, but with a BE port use quantity 16001 added thereto. This column shows the performance of the BE I/F used by the logical volume shown by the storage node ID 4001 and the VOL ID 4002.

FIG. 17 illustrates an example of a migration plan table used in Embodiment 4.

The plan table has not been illustrated in Embodiments 1 through 3, but it is illustrated in Embodiment 4 since the contents of the processes are complex.

A storage node ID 17001 is an ID for uniquely identifying a storage node within the computer system. A VOL ID 17002 is an ID for uniquely identifying a logical volume 1222 in a storage node 1600 shown by the storage node ID 17001.

A port use storage node ID 17003 illustrates a storage node having a port used by the logical volume 1222 shown by the storage node ID 17001 and the VOL ID 17002 after migration. A cache use storage node ID 17004 illustrates a storage node having a cache used by the logical volume 1222 shown by the storage node ID 17001 and the VOL ID 17002 after migration. A storage area use storage node ID 17005 illustrates a storage node having a storage area used by the logical volume 1222 shown by the storage node ID 17001 and the VOL ID 17002 after migration.

Figure 18:
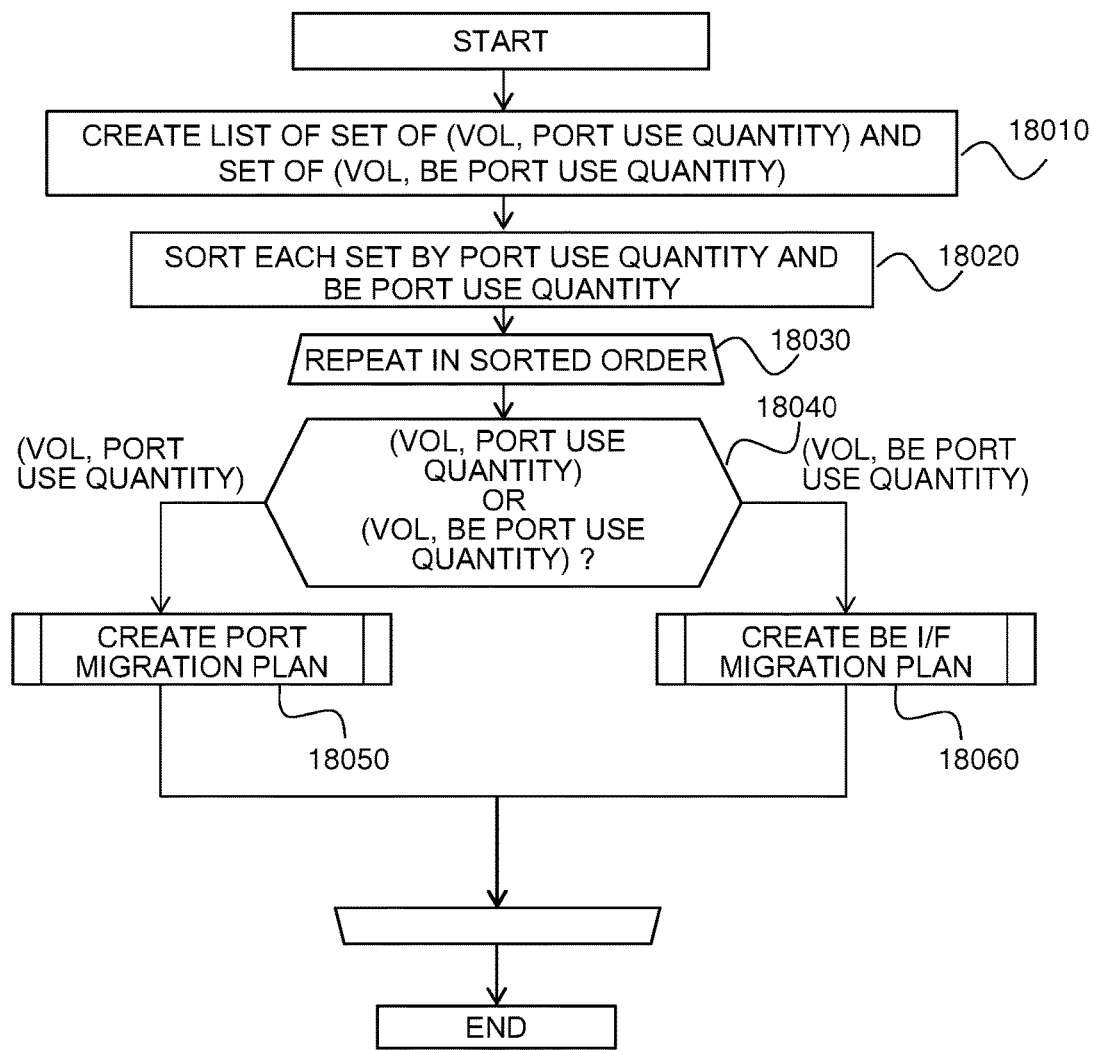
FIG. 18 is a view illustrating an example of the details of processing of the migration plan creation program according to Embodiment 4.

These information are created by the migration plan creation program 1055 based on a flowchart illustrated in FIG. 18, and are initialized before starting the flowchart.

FIG. 18 is a flowchart illustrating a detailed operation example for creating a migration plan according to step 6003 of FIG. 6 in Embodiment 4. Hereafter, the processes of the respective steps according to the migration plan creation program 1055 will be described sequentially.

In step 18010, the procedure refers to the volume information table of FIG. 16, and creates a list of the set of logical volume ID and port use quantity and a set of logical volume ID and BE port use quantity for the respective volumes of the migration source storage node.

In step 18020, the port use quantity and the BE port use quantity are sorted using the port use quantity as key so that the sets are in the order starting from those having the greatest key value.

In step 18030, the subsequent processes are repeated for the sorted sets in the sorted order.

In step 18040, whether the set is a set composed of a logical volume ID and port use quantity or a set composed of a logical volume ID and BE port use quantity is determined.

If the set is composed of a logical volume ID and a port performance use quantity, then in step 18050, the procedure creates a port migration plan. The creation of the port migration plan will be described in detail with reference to FIG. 19. Thereafter, the procedure advances to step 18030 to process the next set.

On the other hand, if the set is composed of a logical volume ID and a BE port use quantity, then in step 18060, a BE I/F migration plan is created. The creation of the BE I/F migration plan will be described in detail with reference to FIG. 20. Thereafter, the procedure advances to step 18030 to perform processing of the next set.

When all the sets are processed, the procedure is ended.

Figure 19:
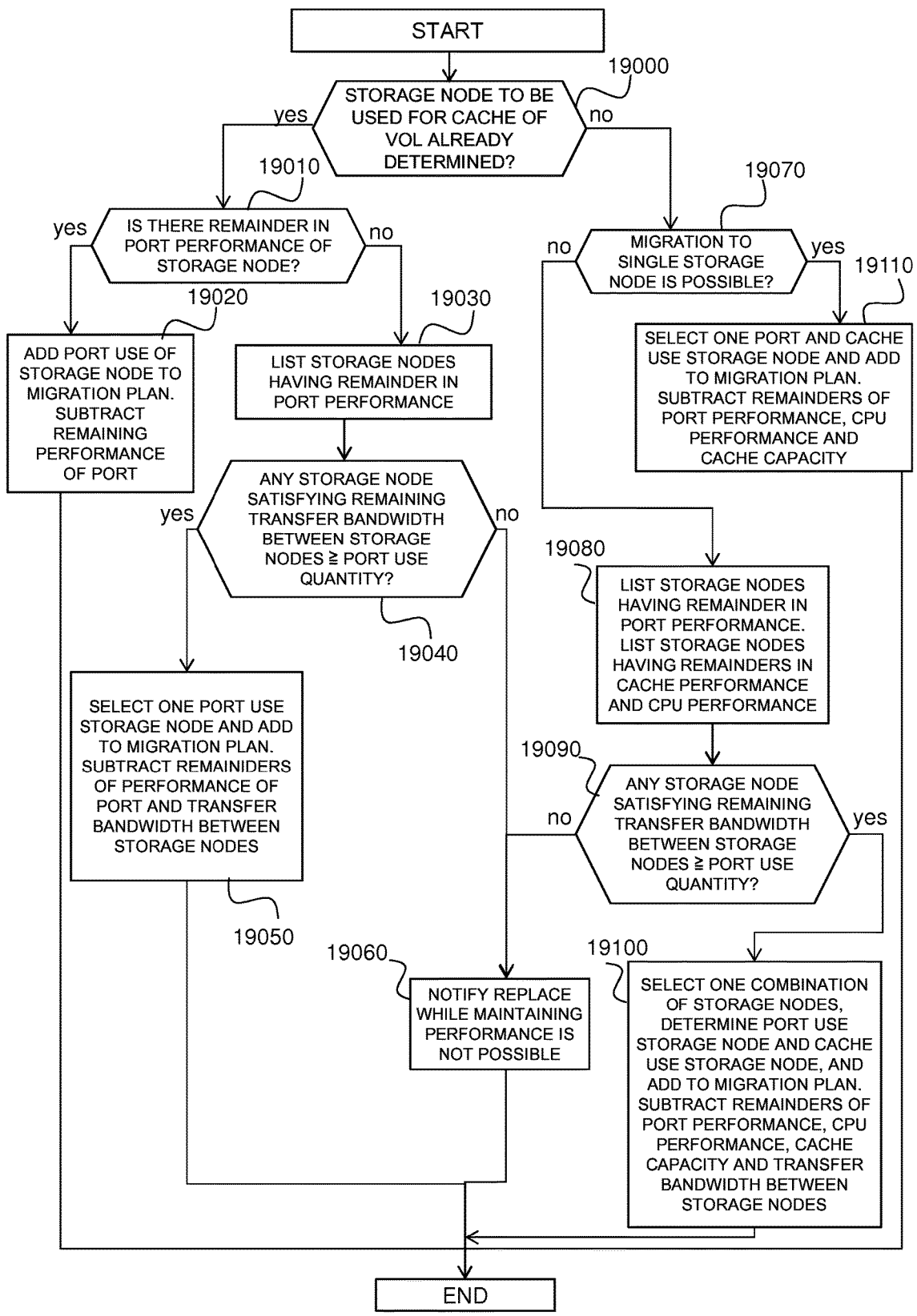
FIG. 19 is a view illustrating an example of the details of creating a port migration plan according to the migration plan creation program of Embodiment 4.

FIG. 19 is a flowchart illustrating a detailed operation example of the creation of the port migration plan according to step 18050 of FIG. 18. Hereafter, the contents of processing of the respective steps according to the migration plan creation program 1055 will be described.

In step 19000, whether the storage node from which the relevant logical volume uses the cache has been determined or not is determined by referring to the migration plan table of FIG. 17. If it is determined (yes), then in step 19010, whether the port performance of the storage node has remainder or not is determined. The details of the determination are similar to Embodiment 1 (step 7030 of FIG. 7).

If there is remainder in the port performance (yes), the information to use the port of the relevant storage node is added to the migration plan in step 19020. Actually, the values of the port use storage node ID 17003 of the record having the storage node ID 17001 and the VOL ID 17002 corresponding to the relevant logical volume is updated. At that time, the remaining performance of the port of that storage node is subtracted.

If there is no remainder in the port performance (no), the storage nodes having remainder in the port performance are listed in step 19030. The actual method of listing the nodes is similar to Embodiment 1 (step 7050 of FIG. 7).

Next, in step 19040, whether there are storage nodes where the remainder of transfer bandwidth of the internal connection connecting the listed storage nodes and the storage node using the cache is equal to or greater than the port use quantity is determined. If there is a storage node having remainder (yes), one of the storage nodes is selected in step 19050, and information is added to the migration plan to use the port of that storage node. At that time, the remaining performance of the port of that storage node and the remainder of transfer bandwidth between storage nodes are subtracted. If there is no storage node having remainder (no), a notice is sent to the user notifying that migration cannot be performed while maintaining performance in step 19060, and the process is ended.

In the determination of step 19000, if the storage from which the relevant logical volume uses the cache is not determined (no), then in step 19070, it is determined whether the port and the cache from a single storage node can be used. Actually, it is determined whether there is a storage node having sufficient remaining performance and remaining capacity for using the amount of port use quantity 4003 of the volume information table (FIG. 16) and the CPU use quantity (calculated from the CPU performance 2003 of the storage node information table (FIG. 15) and the CPU use rate 4004 of the volume information table (FIG. 16)) and the cache use quantity 4005 of the volume information table (FIG. 16).

If there is no corresponding storage node (no), the storage nodes having sufficient remaining performance for using the port use quantity 4003 are listed in step 19080. Further, the storage nodes having sufficient remaining performance for using the CPU use quantity (calculated from the CPU performance 2003 and the CPU use rate 4004) and the cache use quantity 4005 are listed.

Next, in step 19090, it is determined whether there is a transfer bandwidth between storage nodes listed in the previous step 19080 where the remainder of transfer bandwidth is equal to or greater than the value of the port use quantity 4003 in the volume information table (FIG. 16).

If there is no corresponding transfer bandwidth (no), a notice is sent to the user notifying that it is not possible to perform migration while maintaining performance in step 19060, and the process is ended.

If there is a corresponding transfer bandwidth (yes), one of the corresponding combinations of storage nodes is selected in step 19100, and information is added to the migration plan to use a port of the storage node having remainder in the port performance and to use a cache of the storage node having remainders in the cache performance and CPU performance.

Actually, the value of the port use storage node ID 17003 and the value of the cache use storage node ID 17004 of the record having the storage node ID 17001 and the VOL ID 17002 corresponding to the relevant logical volume are updated in the migration plan table of FIG. 17. At that time, the respective remainders of the port performance, the CPU performance, the cache capacity and the transfer bandwidth between storage nodes are subtracted.

On the other hand, if it is determined in step 19070 that a port and a cache from the single storage node can be used (yes), one of the storage nodes is selected in step 19110, and information is added to the migration plan to use the port and cache of that storage node. In that case, the respective remainders of the port performance, the CPU performance and the cache capacity are subtracted.

Figure 20:
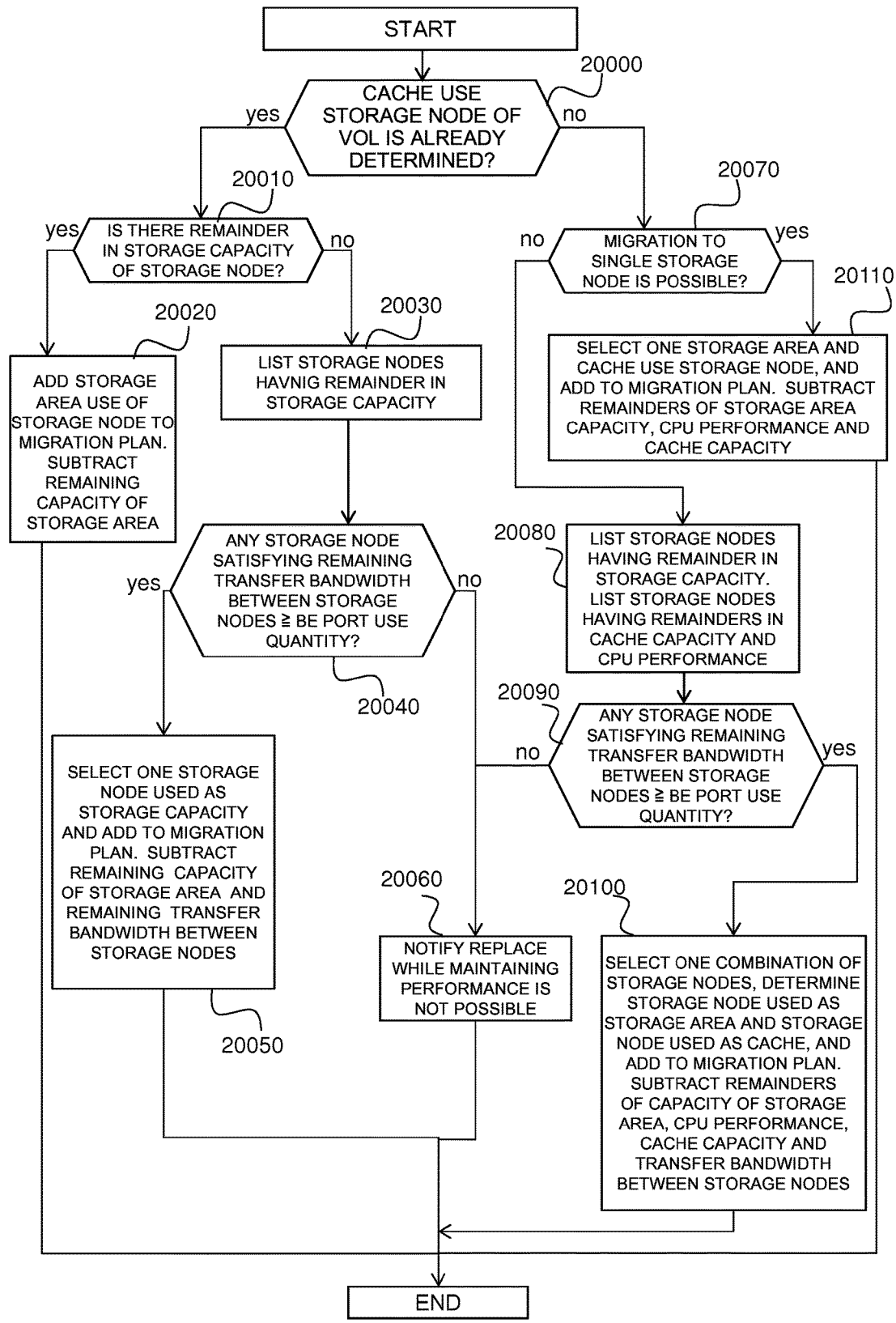
FIG. 20 is a view illustrating an example of the details of creating a BE I/F migration plan according to the migration plan creation program of Embodiment 4.

FIG. 20 is a flowchart illustrating a detailed operation example of the creation of a BE I/F migration plan according to step 18060 of FIG. 18. Hereafter, the contents of processing of the respective steps according to the migration plan creation program 1055 are sequentially described.

In step 20000, whether the storage node from which the relevant logical volume uses the cache is already determined or not is determined by referring to the migration plan table of FIG. 17. If it is already determined (yes), whether the storage node has remainder in the storage capacity or not is determined in step 20010. The details of the determination are similar to Embodiment 1 (step 7030 of FIG. 7). If there is remainder (yes), information is added to the migration plan to use the storage area of that storage node in step 20020.

Actually, the value of the storage area use storage node ID 17005 of the record having the storage node ID 17001 and the VOL ID 17002 corresponding to the relevant logical volume is updated in the migration plan table of FIG. 17. At that time, the remaining capacity of the storage area of that storage node is subtracted.

Further, in the determination of step 20010, if there is no remainder in the storage capacity of that storage node (no), the storage nodes having remainder in the storage capacity are listed in step 20030. The actual system of listing is similar to Embodiment 1 (step 7050 of FIG. 7). Then, in step 2004, whether there is a storage node where the remainder of the transfer bandwidth of the internal connection between the listed storage node and the storage node using the cache is equal to or greater than the BE port use quantity 16001 of the volume information table of FIG. 16 is determined in step 20040.

If there is a storage node having remainder (yes), one of such storage nodes is selected in step 20050, and information is added to the migration plan so as to use the port of that storage node. At that time, the remaining capacity of the storage area of that storage node and the remainder of the transfer bandwidth between the storage nodes are subtracted. If there is no storage node having remainder (no), a notice is sent to the user notifying that migration cannot be performed while maintaining performance in step 20060, and the procedure is ended.

On the other hand, if the storage of which the relevant logical volume uses the cache is not determined in the determination of step 20000 (no), whether the storage area and the cache of a single storage node can be used or not is determined in step 20070. Actually, determination is made on whether there is a storage node having sufficient remaining performance and remaining capacity for using the storage capacity 4006 of the volume information table (FIG. 16), the CPU use quantity (computed based on the CPU performance 2003 of the storage node information table (FIG. 15) and the CPU use rate 4004 of the volume information table (FIG. 16)) and the cache capacity 4005 of the volume information table (FIG. 16).

If there is no corresponding storage node (no), the storage nodes having sufficient remaining capacity for using the storage capacity 4006 are listed in step 20080. Further, the storage nodes having sufficient remaining performance for using the CPU use quantity (calculated based on the CPU performance 2003 of the storage node information table (FIG. 15) and the CPU use rate 4004 of the volume information table (FIG. 16)) and the cache capacity 4005 of the volume information table (FIG. 16) are listed.

Next, in step 20090, whether there is any storage node having the remainder of the transfer bandwidth between storage nodes listed in the previous step 20080 greater than the value of the BE port use quantity 16001 of the volume information table of FIG. 16 is determined. If there is no storage node having remainder (no), then in step 20060, a notice is sent to the user notifying that migration maintaining performance cannot be performed, and the process is ended. If there is a storage node having remainder (yes), one of the combinations of storage nodes out of the corresponding conditions is selected, and information is added to the migration plan so as to use the storage area of the storage node having remainder in the storage area and the cache of the storage node having remainder in the cache performance and the CPU performance.

Actually, in the migration plan table of FIG. 17, the values of the storage area use storage node ID 17005 and the cache use storage node ID 17004 of the record having the storage node ID 17001 and the VOL ID 17002 corresponding to the relevant logical volume are updated. At that time, the respective remainders of the capacity of the storage area, the CPU performance, the cache capacity and the transfer bandwidth between storage modes are subtracted.

On the other hand, in the determination of step 20070, if the storage area and the cache of a single storage node can be used (yes), one of such storage nodes is selected in step 20110, and information is added to the migration plan to use the storage area and the cache of that storage node. At that time, the remainders of the respective storage area capacity, the CPU performance and the cache capacity are subtracted.

The respective embodiments mentioned above illustrate the characteristic features of the present invention, but they are not intended to restrict the present invention in any way. The preferred embodiments of the present invention are described in sufficient detail so that those with ordinary skill in the field of art can carry out the present invention, but it should be noted that other embodiments are possible, and changes of configuration or replacement of various components of the invention can be performed without departing from the spirit and scope of the present invention.

Therefore, the above description should not be interpreted to limit the scope of the present invention. A portion of the configuration of an embodiment can be added to or replaced with the configuration of another embodiment without departing from the spirit of the present invention. The preferred embodiments of the present invention can be implemented via software operating in a general-purpose computer, via dedicated hardware, or via a combination of software and hardware.

In the above description, information used in the present embodiments are mainly in the form of a "table", but the various information are not limited to data structures in the form of tables, and data structures such as lists, DBs, queues and other formats can be adopted.

The processes according to the present embodiments have been described using the term "program" as the subject (subject of operation), wherein a program is executed by a processor performing determined processes using memories and communication ports (communication control units). Therefore, the embodiments can also be described using the term processor as the subject.

The processes illustrated using the term program as the subject can also be performed by a management computer or other computers or a storage system. A portion of or all the programs can be realized by a dedicated hardware, or can be formed as a module.

Information such as programs, tables and files for realizing the respective functions can be stored in a storage device such as a nonvolatile semiconductor memory, a hard disk drive or an SSD (Solid State Drive), or in a computer-readable non-temporary data storage media such as an IC card, an SD card or a DVD. Further, the information can be installed to a computer or a computer system via a program distribution server or a non-temporary storage media.

REFERENCE SIGNS LIST

1000 Management computer
1100 Virtual storage system
1200 Storage node
1300 Host computer
1400 Management network
1500 Data network
1600 Migration source storage node
1010, 1213 CPU
1020 Display device
1030 Input device
1040 NIC
1050, 1215 Memory
1210 Controller
1220 Storage media unit
1230 Internal connection

The invention claimed is:

1. A system for migrating data, comprising:
a host computer;
a first physical storage node configured to store a volume;
a plurality of second physical storage nodes which are mutually connected and are configured to provide a virtual storage system in response to the host computer using a same identifier; and
a management computer programmed to manage a migration of the volume from the first physical storage node to the virtual storage system,
wherein the management computer is further programmed to:
acquire a port use quantity, a CPU use quantity, a cache use quantity, and a storage capacity of the volume on the first physical storage node;
acquire a remaining port quantity, a remaining CPU quantity, a remaining cache capacity, and a remaining storage capacity for each of the second physical storage nodes;
acquire a remaining transfer bandwidth between each of the second physical storage nodes;
when a single one of the second physical storage nodes does not have the remaining port quantity and the remaining storage capacity to satisfy the port use quantity and the storage capacity of the volume on the first physical node, select a combination of a first candidate node of the second physical storage nodes from the second physical storage nodes having the remaining port quantity satisfying the port use quantity of the volume on the first physical node and a second candidate node of the second physical storage nodes from the second physical storage nodes having the remaining CPU quantity, the remaining cache capacity, and the remaining storage capacity satisfying the CPU use quantity, the cache use quantity, and the storage capacity of the volume on the first physical node; and
when a remaining transfer bandwidth on a transfer path between the first candidate node and the second candidate node satisfies the port use quantify of the volume on the first physical node, allocate a port corresponding to the remaining port quantity of the first candidate node as a migration destination port of the volume in the virtual storage system, and allocate a storage area corresponding to the remaining storage capacity of the second candidate node as a migration destination storage area of the volume in the virtual storage system, and wherein data of the volume on the first physical storage node is migrated to the allocated storage area of the second candidate node, and access to the volume is set to the allocated port of the first candidate node.

2. The system for migrating data according to claim 1, wherein the management computer is further programmed to:

update the respective remaining transfer bandwidth, remaining port quantity, remaining CPU quantity, remaining cache capacity, and remaining storage capacity for the first candidate node and the second candidate node after migrating the data of the volume.

3. The system for migrating data according to claim 1, wherein the management computer is further programmed to:

calculate the remaining transfer bandwidth on the transfer path by multiplying the remaining transfer bandwidth between the first candidate node and the second candidate node by a predetermined transfer bandwidth use rate threshold.

4. The system for migrating data according to claim 1, wherein the management computer is further programmed to:

when a third node of the second physical storage nodes does have the remaining port quantity and the remaining storage capacity to satisfy the port use quantity and the storage capacity of the volume on the first physical node, allocate a port corresponding to the remaining port quantity of the third node as the migration destination port of the volume in the virtual storage system and allocate a storage area corresponding to the remaining storage capacity of the third node as the migration destination storage area of the volume in the virtual storage system, and wherein the data of the volume on the first physical storage node is migrated to the allocated storage area of the third node, and access to the volume is set to the allocated port of the third node.

5. The system for migrating data according to claim 1, wherein the second physical storage nodes are programmed to:

execute at least one of a replication function or a snapshot function of the volume, which is a logical volume, on the first physical storage node to migrate the volume to the virtual storage system.

6. The system for migrating data according to claim 1, wherein the second physical storage nodes are mutually connected in a row, and wherein the management computer is further programmed to:

select the combination of the first candidate node and the second candidate node from among the second physical storage nodes so that a number of the second physical storage nodes included in transfer path is smallest.

7. The system for migrating data according to claim 1, wherein the acquired port use quantity, CPU use quantity, and cache use quantity indicate a transfer performance regarding an I/O command to storage media included in the first physical storage node and the acquired remaining port quantity, remaining CPU quantity, and remaining cache capacity indicate a transfer performance regarding an I/O command to storage media included in the plurality of second physical storage nodes.

8. The method for migrating data according to claim 1, wherein the remaining storage capacity of the second candidate node corresponds to a plurality of storage media therein which satisfies the storage capacity of the volume on the first physical node.

9. A method for migrating data, comprising:

providing a management computer for managing a first physical storage node which stores a volume and a plurality of second physical storage nodes;

providing a virtual storage system in response to a host computer from the plurality of second physical storage nodes using a same identifier; and migrating data of the volume from the first physical storage node to the virtual storage system, wherein the migration of the volume from the first physical storage node to the virtual storage system includes:

acquiring a port use quantity, a CPU use quantity, a cache use quantity, and a storage capacity of the volume on the first physical storage node;

acquiring a remaining port quantity, a remaining CPU quantity, a remaining cache capacity, and a remaining storage capacity for each of the second physical storage nodes;

acquiring a remaining transfer bandwidth between each of the second physical storage nodes;

when a single one of the second physical storage nodes does not have the remaining port quantity and the remaining storage capacity to satisfy the port use quantity and the storage capacity of the volume on the first physical node, select a combination of a first candidate node of the second physical storage nodes from the second physical storage nodes having the remaining port quantity satisfying the port use quantity of the volume on the first physical node and a second candidate node of the second physical storage nodes from the second physical storage nodes having the remaining CPU quantity, the remaining cache capacity, and the remaining storage capacity satisfying the CPU use quantity, the cache use quantity, and the storage capacity of the volume on the first physical node; and when a remaining transfer bandwidth on a transfer path between the first candidate node and the second candidate node satisfies the port use quantify of the volume on the first physical node, allocate a port corresponding to the remaining port quantity of the first candidate node as a migration destination port of the volume in the virtual storage system, and allocate a storage area corresponding to the remaining storage capacity of the second candidate node as a migration destination storage area of the volume in the virtual storage system, and wherein data of the volume on the first physical storage node is migrated to the allocated storage area of the second candidate node, and access to the volume is set to the allocated port of the first candidate node.

10. The method for migrating data according to claim 9, further comprising:

updating the respective remaining transfer bandwidth, remaining port quantity, remaining CPU quantity, remaining cache capacity, and remaining storage capacity for the first candidate node and the second candidate node.

11. The method for migrating data according to claim 9, wherein the migration of the volume from the first physical storage node to the virtual storage system further includes:

calculating the remaining bandwidth on the transfer path by multiplying the remaining transfer bandwidth between the first candidate node and the second candidate node by a predetermined transfer bandwidth use rate threshold.

12. The method for migrating data according to claim 9, wherein the migration of the volume from the first physical storage node to the virtual storage system further includes:
   when a third node of the second physical storage nodes does have the remaining port quantity and the remaining storage capacity to satisfy the port use quantity and the storage capacity of the volume on the first physical node, allocate a port corresponding to the remaining port quantity of the third node as the migration destination port of the volume in the virtual storage system and allocate a storage area corresponding to the remaining storage capacity of the third node as the migration destination storage area of the volume in the virtual storage system, and
   wherein the data of the volume on the first physical storage node is migrated to the allocated storage area of the third node, and access to the volume is set to the allocated port of the third node.

13. The method for migrating data according to claim 9, wherein
   the remaining storage capacity of the second candidate node corresponds to a plurality of storage media therein which satisfies the storage capacity of the volume on the first physical node.

* * * * *